US008726042B2

(12) United States Patent
Lange et al.

(10) Patent No.: US 8,726,042 B2
(45) Date of Patent: May 13, 2014

(54) TAMPER RESISTANT MEMORY PROTECTION

(75) Inventors: Sebastian Lange, Seattle, WA (US); Dinarte R. Morais, Redmond, WA (US); Victor Tan, Kirkland, WA (US); Adam G. Poulos, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 12/040,654

(22) Filed: Feb. 29, 2008

(65) Prior Publication Data

US 2009/0222675 A1 Sep. 3, 2009

(51) Int. Cl.
*G06F 12/14* (2006.01)

(52) U.S. Cl.
USPC ............................ 713/193; 713/189; 713/190

(58) Field of Classification Search
USPC ..................... 713/187, 189, 192–194; 726/26
See application file for complete search history.

(56) References Cited

U.S. PATENT DOCUMENTS

| | | | |
|---|---|---|---|
| 5,825,878 A * | 10/1998 | Takahashi et al. | 713/190 |
| 6,965,977 B2 | 11/2005 | Yi | 711/169 |
| 7,162,645 B2 | 1/2007 | Iguchi et al. | 713/193 |
| 7,203,841 B2 | 4/2007 | Jackson et al. | 713/187 |
| 7,219,369 B2 | 5/2007 | Hasimoto et al. | 726/21 |
| 7,308,542 B1 | 12/2007 | Chicks et al. | 711/154 |
| 7,415,109 B2 * | 8/2008 | Rose et al. | 380/37 |
| 7,428,636 B1 * | 9/2008 | Waldspurger et al. | 713/164 |
| 7,818,523 B2 * | 10/2010 | Norman | 711/163 |
| 2002/0049909 A1 * | 4/2002 | Jackson et al. | 713/188 |
| 2003/0051135 A1 * | 3/2003 | Gill et al. | 713/160 |
| 2003/0115476 A1 * | 6/2003 | McKee | 713/193 |
| 2003/0188178 A1 * | 10/2003 | Strongin et al. | 713/193 |
| 2003/0231767 A1 * | 12/2003 | Carbajal | 380/200 |
| 2004/0091114 A1 * | 5/2004 | Carter et al. | 380/259 |
| 2004/0111520 A1 * | 6/2004 | Krantz et al. | 709/229 |
| 2004/0143748 A1 | 7/2004 | Yamaguchi et al. | 713/193 |
| 2004/0165413 A1 | 8/2004 | Takagi et al. | 365/148 |

(Continued)

FOREIGN PATENT DOCUMENTS

WO WO 2008/054456 A2 * 5/2008

OTHER PUBLICATIONS

US 2010/0122095, 5/2010, Jones et al. (withdrawn).*

(Continued)

*Primary Examiner* — Linglan Edwards
(74) *Attorney, Agent, or Firm* — Aaron Chatterjee; Andrew Sanders; Micky Minhas

(57) ABSTRACT

Various mechanisms are disclosed for protecting the security of memory in a computing environment. A security layer can have an encryption layer and a hashing layer that can dynamically encrypt and then dynamically hash sensitive information, as it is being loaded to dynamic memory of a computing device. For example, a memory unit that can correspond to a memory page can be processed by the security layer, and header data, code, and protect-worthy data can be secured, while other non-sensitive data can be left alone. Once such information is secured and stored in dynamic memory, it can be accessed at a later time by a processor and unencrypted and hash checked. Then, it can be loaded back onto the dynamic memory, thereby preventing direct memory access attacks.

18 Claims, 10 Drawing Sheets

(56) References Cited

U.S. PATENT DOCUMENTS

| | | | |
|---|---|---|---|
| 2005/0182952 A1* | 8/2005 | Shinozaki | 713/189 |
| 2005/0278787 A1 | 12/2005 | Naslund et al. | 726/26 |
| 2006/0015748 A1* | 1/2006 | Goto et al. | 713/190 |
| 2006/0036857 A1* | 2/2006 | Hwang | 713/168 |
| 2006/0047972 A1* | 3/2006 | Morais | 713/190 |
| 2006/0236026 A1 | 10/2006 | Hemple | 711/103 |
| 2007/0180276 A1 | 8/2007 | Everett et al. | 713/194 |

OTHER PUBLICATIONS

Shi, Weidong., "Architectural Support for Protecting Memory Integrity and Confidentiality," College of Computing Georgia Institute of Technology, 2006, p. 1-154.

Shi et al., "Architecture Support for High Speed Protection of Memory Integrity and Confidentiality in Symmetric Multiprocessor Systems," Georgia Institute of Technology, 2004, p. 1-13.

* cited by examiner

TAMPER RESISTANT MEMORY PROTECTION

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright® 2008 Microsoft Corp.

FIELD OF TECHNOLOGY

The presently disclosed subject matter relates to the field of computing, and more particularly, to fields such as media content, although this is merely an exemplary and non-limiting field.

BACKGROUND

Data memory in game consoles, as well as open computing platforms (such as personal computers), is usually susceptible to hacking attacks that can either fully compromise the security system of a given device, or minimally cause specific applications to misbehave, such as granting their users undeserved privileges. Such attacks can include: a game cheat device that modifies memory to give a gamer unlimited ammunition in a shooter game, thus allowing the gamer to attain better achievements than had the hack not occurred; or, a device that changes the in-memory value of a pre-paid cell phone, thus allowing a user to increase the available minutes. Hence, what is needed is tamper resistant memory protection mechanisms to prevent such hacks and any other hacks prevalent in the field.

SUMMARY OF THE INVENTION

Various mechanisms are disclosed for protecting the security of memory in a computing environment. A security layer can have an encryption layer and a hashing layer that can dynamically encrypt and then dynamically hash sensitive information, as it is being loaded from a first memory to a second memory, where the second memory can comprise dynamic runtime memory or persistent storage memory. For example, a memory unit that can correspond to a memory page can be processed by the security layer, and header data, code, and protect-worthy data can be secured, while other non-sensitive data can be left alone. Once such information is secured and stored in the second memory, it can be accessed at a later time and loaded back onto the first memory (which may include on-chip local cache memory). This process may entail checking for hash integrity and then decrypting the sensitive information, while at the same time simply loading other non-sensitive information.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION OF ILLUSTRATIVE EMBODIMENTS

Overview

The presently disclosed subject matter is designed to prevent illicit outside read and/or write access to data memory by encrypting (and/or signing) data page content as it is written into memory. Moreover, it is designed to decrypt such content as it is read out of memory by legitimate application calls. Thus, attempts to physically read protected data can result in garbled returned data, and any attempt to modify memory can result in a system failure. The presently disclosed subject matter envisions a system that is transparent to the application layer and can be optionally enabled for specific application data in order to avoid potential performance degradations.

Aspects of Tamper Resistant Memory Protection

Figure 1:
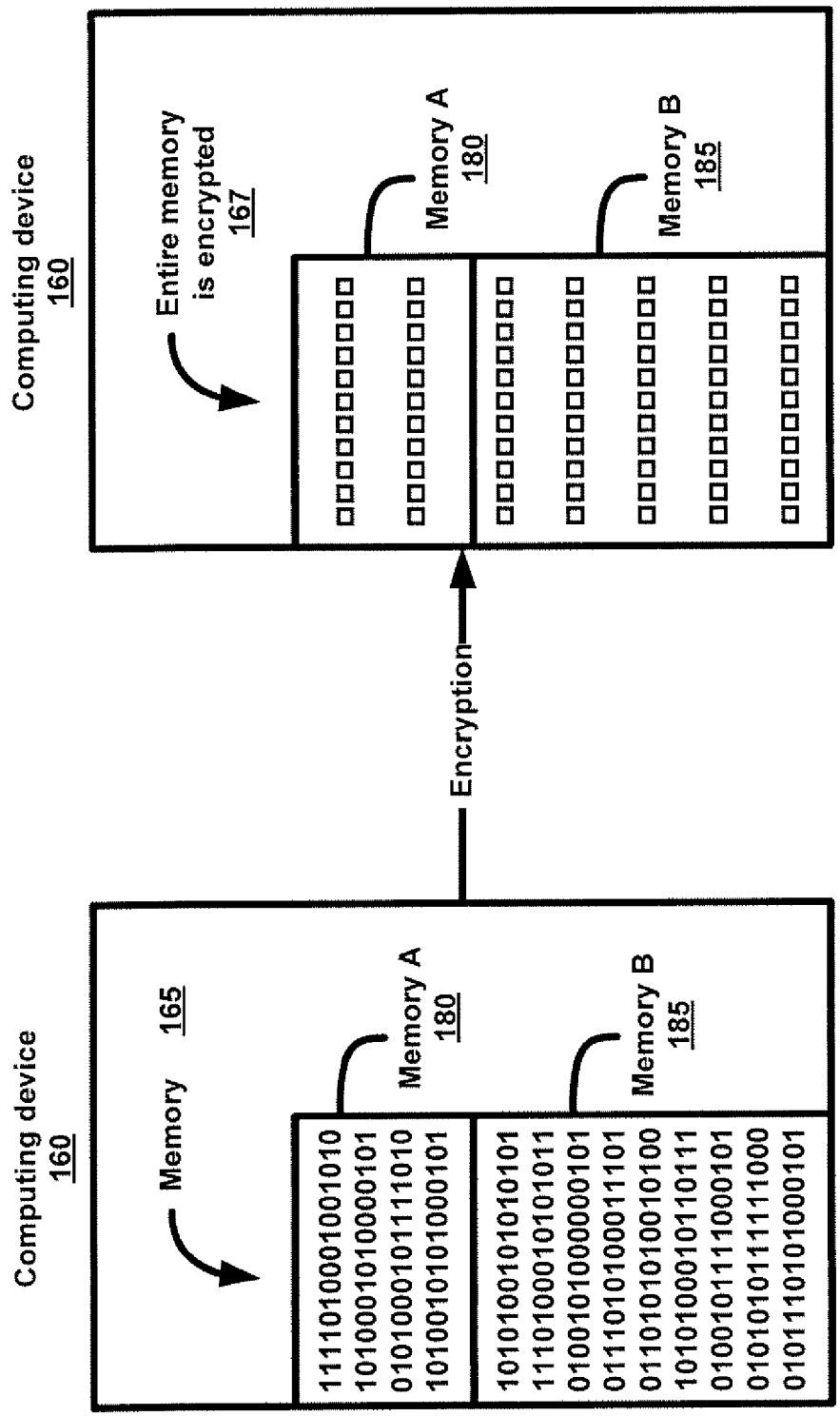
FIG. 1 illustrates that in the prior art all of memory was protected, instead of only selected portions of sensitive memory.

FIG. 1 illustrates that in the prior art, all of memory was protected, instead of only selected portions of sensitive memory. Thus, a computing device 160 having a memory 165 would typically have all code and data encrypted (and/or hashed—not shown). If the memory 165 comprised of different dynamic memories, such as memory A 180 and memory B, that memory 165 would be encrypted regardless of the protection warranted by the code and/or data. By way of example and not limitation, in FIG. 1, memory 165 could be runtime dynamic memory such as random access memory (RAM). Alternatively, in other aspects of the presently disclosed subject matter, it could be persistent memory such as hard disk device.

In the scenario where memory A 180 and memory B 185 stand for different locations of one single memory 165 (or even two different memories altogether), in the prior art both locations would be encrypted 167 even if memory A 180 contained sensitive code and/or data but memory B 185 contained non-sensitive code and/or data. This resulted in unnecessary wastage of computing processing resources, since non-sensitive code and/or data did not need to be protected. Moreover, another downside of security systems where all memory is encrypted is an increase in difficulty of interoperating with peripheral devices. Peripheral devices including DVD drives, hard disks and USB input devices are capable of directly writing to memory. However, if this memory has a requirement of being properly encrypted, all peripheral devices that could access this memory would have be knowledgeable of the encryption method and any required cryptographic secrets. Still furthermore, on a finer scale of granularity, in the prior art if a memory page was accessed, and such a page contained both sensitive and non-sensitive code and/or data, the entire page was encrypted (thus, in another scenario, memory A 180 and memory B 185 can stand for different memory pages in the memory 165). This again resulted in processing resource wastage.

Figure 2:
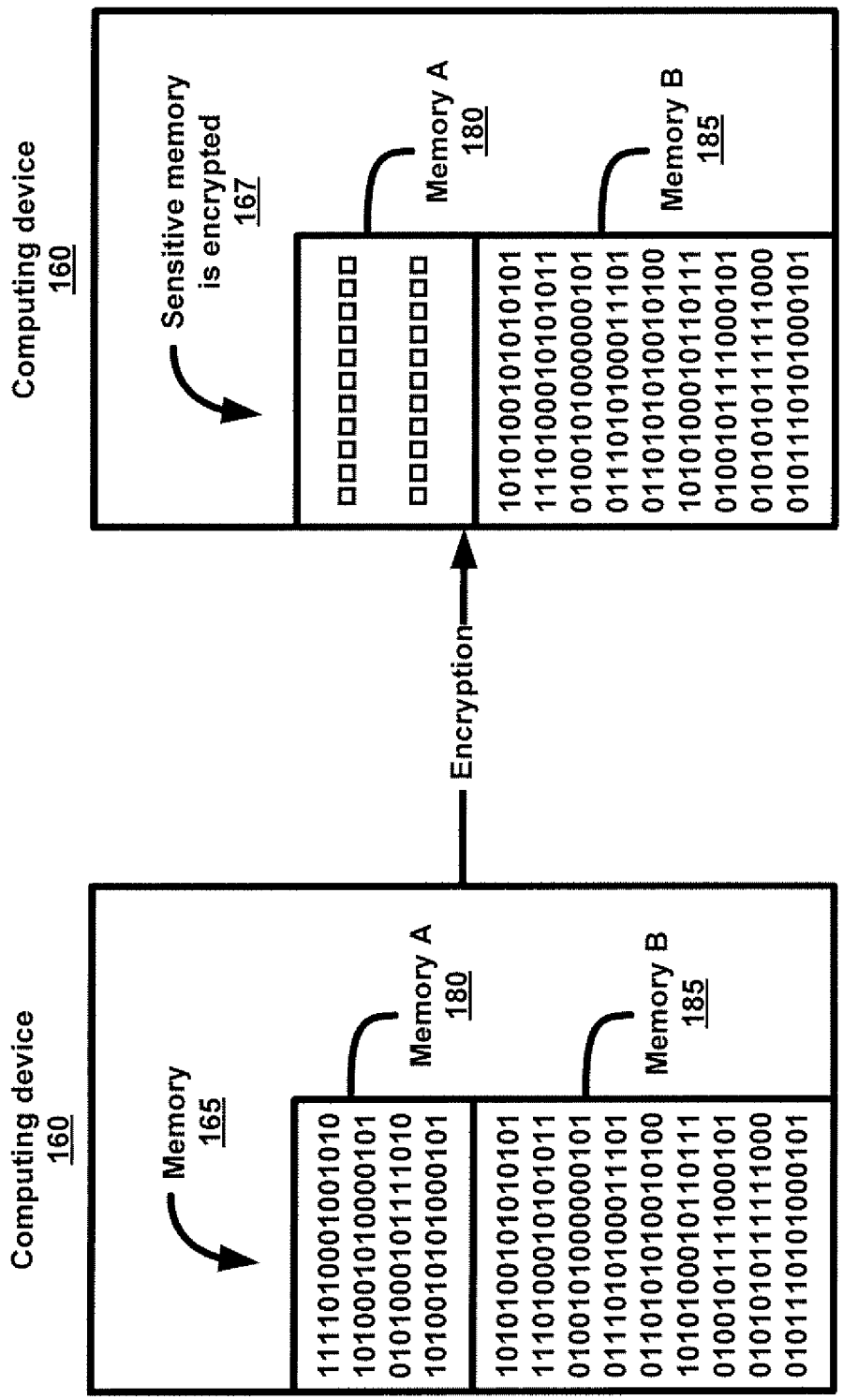
FIG. 2 represents an improvement over the prior art where selected portions of memory are protected, that is, encrypted and/or hashed.

Thus, in contrast to FIG. 1, FIG. 2 represents an improvement over the prior art where selected portions of memory are protected, that is, encrypted and/or hashed. In direct contrast to FIG. 1, in FIG. 2 only memory A 180 is encrypted and memory B 185 is not encrypted. In the aforementioned scenario where memory A 180 is a first page of memory, and memory B 185 is a second page of memory, only the former page would be encrypted 167.

Furthermore, on an even finer scale of granularity, the shown memory 165 can stand for a single memory page, and memory A 180 and memory B 185 can be different portions of the same memory page 165. It should be noted, that the memory 165 can also stand for a selected amount of bits or bytes of memory and does not have to correspond to a traditional notion of a memory page, as those of skill in the art would understand that concept. Thus, any given page could be accessed by a computing system, and only sensitive portions of that page could be encrypted. The rest of the code and/or data could be left alone, and any computing resources could be accorded towards other tasks.

Figure 3:
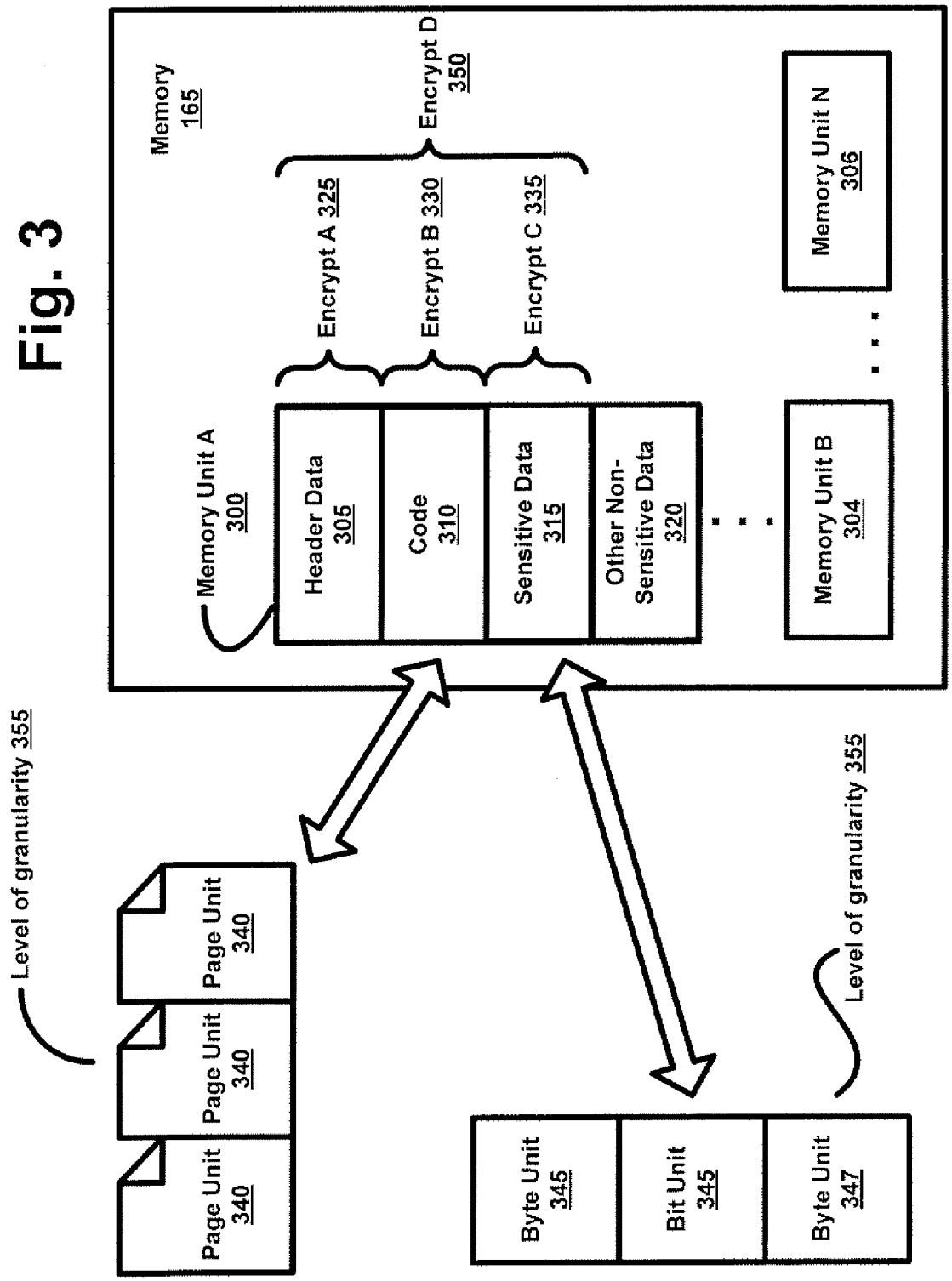
FIG. 3 illustrates various levels of granularity that can be protected, such as pages or selected byte units.

FIG. 3 shows the different levels of granularity 355 that were discussed above. For example, given a memory page 340, this memory page 340 could comprise of at least four types of information: (1) header data 305; (2) code 310; (3) sensitive data 315; and (4) other non-sensitive data 320. All this information could correspond to a memory unit A 300, which in turn could correspond to a memory page 340.

In an alternative aspect of the presently disclosed subject matter, memory unit A 300 could correspond to a selected number of bits 345 or bytes 347. For example, this selected number could vary, such as being 8 bytes for one memory unit, 1024 bytes for another memory unit, or 4096 bytes for still another memory unit. Alternatively, all memory units could be of a fixed, uniform size, depending on the specific implementation.

Any given memory 165 could comprise of a plurality of such memory units, such as memory unit A 300, memory unit B 304 and memory unit N 306. Each memory unit could have all of its protect-worthy information encrypted or individually encrypted. As is shown in FIG. 3, the header data 305 could be encrypted 325, the code 310 could be encrypted, and the sensitive data could be encrypted 335. Furthermore, an encryption 350 or the encryptions 325, 330, 335 could be performed.

Figure 4:
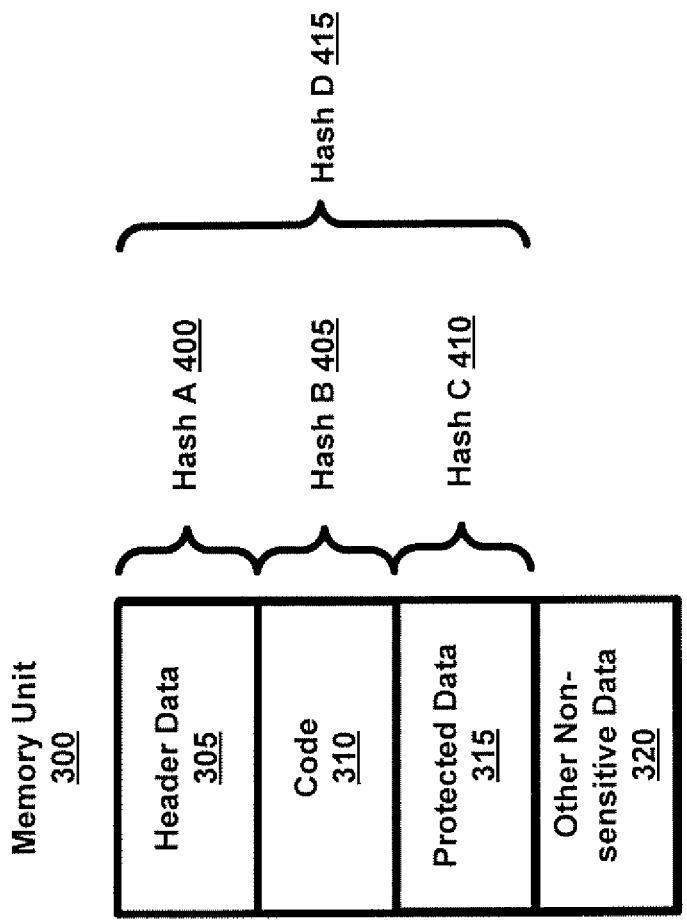
FIG. 4 illustrates measures additional to encrypting and hashing that can be taken, such as performing hashes of hashes.

As is shown in FIG. 4, this scenario also could hold analogously true for hashing such information. Thus, the header data 305 could be hashed 400, the code 310 could be hashed 405, and the sensitive data 315 could be hashed. Moreover, a hash 415 of hashes 400, 405, 410 could be performed for added information integrity (provided that hashed information could be protected by a reliable cryptographic signature). The encryption discussed with respect to FIG. 3 could be performed in combination with the hashing shown in FIG. 4. Encryption could ensure that information is not readable, and hashing could ensure that information is not writable.

Figure 5:
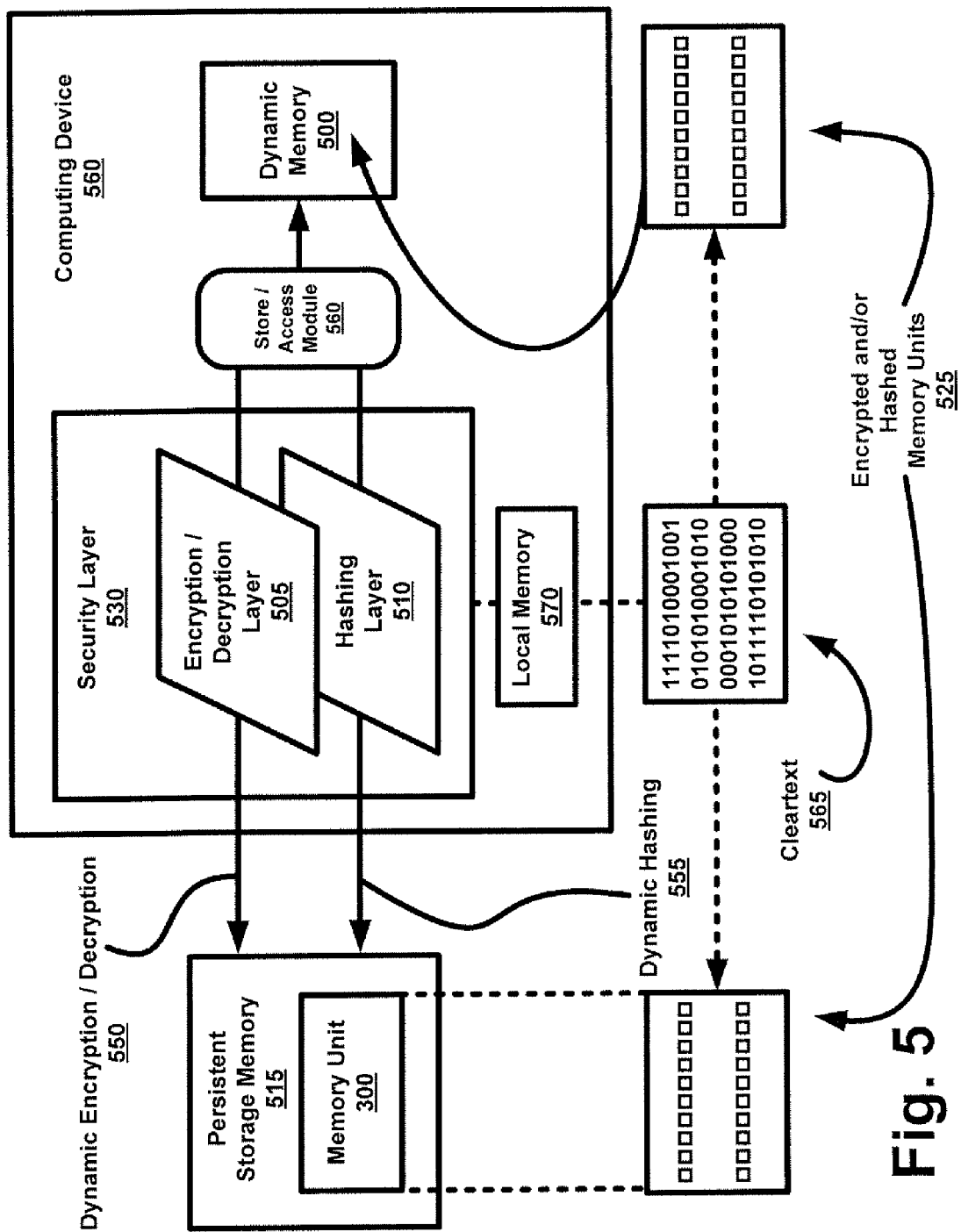
FIG. 5 illustrates a security layer having an encryption/decryption layer and a hashing layer in order to provide a system, method, and/or computer executable instructions to dynamically protect sensitive information.

Next, FIG. 5 illustrates a security layer 530 that could be responsible for encryption 505 and/or hashing of selected information 510. The security layer 530 could be a system or computer readable medium bearing computer executable instructions for managing encryption 505 and/or hashing 510 (alternatively, it could be practiced as a method for encryption 505 and/or hashing 510). On the other hand, the security layer 530 could also be used for decryption and for checking hashes.

When information is read from, for example, a hard disk, it could be decrypted and hashes could be checked for integrity, and then such information could be loaded onto a console random access memory. Alternatively, when information is stored from the console random access memory onto the hard disk, such information could be dynamically and selectively encrypted and hashed, thus ensuring that any sensitive data (and/or header data and/or code) is securely stored on the hard disk. Of course, it is contemplated herein that such encryption/decryption and hashing/checking could occur between any kind of memories on any kind of computing devices, whether flash memory or on-chip memory, or general computing devices or closed computing devices.

Turning now to FIG. 5, a memory unit 300 can be accessed from some remote memory 500 (such as a persistent memory, as exemplified by hard drives, jump drives, etc.). Information in the memory unit 300 can be originally encrypted and hashed 525, and then decrypted and hash-checked and stored onto local computing device memory 570 (such as local on-chip memory or some intermediate memory inside a device). The security layer 530 can dynamically decrypt 550 the relevant information in the memory unit 300 and dynamically check for hash integrity 555 via a decryption layer 505 and a hashing layer 510, respectively. Such decryption and checking can be performed on-the-fly on a memory unit-by-memory unit basis and then loaded onto local memory 570 as cleartext 565 (i.e. unencrypted and understandable information). Other non-sensitive information can be simply loaded without having the security layer 530 process such non-sensitive information.

Once the relevant information is locally loaded 570, it can be read and written, and then loaded onto dynamic memory 500, such as random access memory (RAM). In such a scenario, any important header data, code, and sensitive information can be dynamically encrypted and hashed on a memory unit-by-memory unit basis and stored by a module 560 into the dynamic memory 500 (a loader can contain the store/access module 560). The result is that important information can be secured 525 while also allowing the unobstructed access/storing of non-sensitive information that does not need to be protected. In short, in this aspect of the presently disclose subject matter, sensitive information can be protected 525 not only on persistent memory devices 515, but also on dynamic memory devices 500. Such protection address direct memory access (DMA) hacking, which may occur when information is loaded and stored on dynamic memory.

Figure 6:
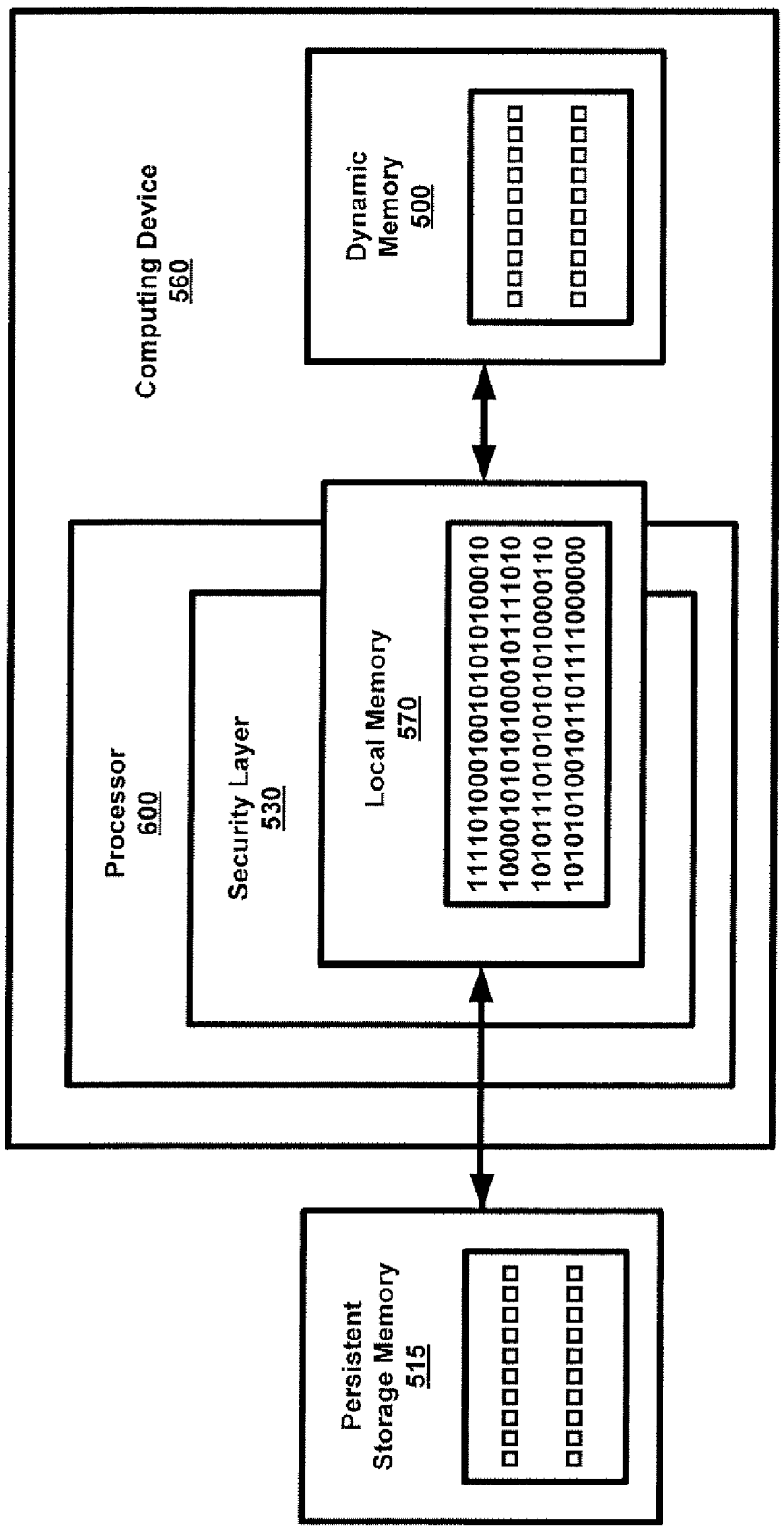
FIG. 6 illustrates one exemplary and non-limiting aspect of the presently disclosed subject matter where information is protected in various memory contexts and yet readable and writeable in other memory contexts.

Further to this point, FIG. 6 illustrates one exemplary and non-limiting aspect of the presently disclosed subject matter where information is protected in various memory contexts and yet readable and writeable in other memory contexts. In the context of persistent storage memory 515 and dynamic memory 500 (such as RAM), sensitive information is encrypted and/or hashed. While in local memory 570, such information may be unencrypted and hash checked. In FIG. 6, the local memory 570 is shown being separated from the dynamic memory 500. Local memory 570 can on-chip memory (e.g. L1 cache) or memory in between a processor and RAM (e.g. L2 or L3 cache). Of course, the local memory 570 may still be some other memory storage device, not part of the processor 600 and not part of the dynamic memory 500. In FIG. 5, the local memory 570 is shown as either subsisting on the processor 600 or outside the processor 600—yet, being separate from the dynamic memory 500. In short, the architecture shown in FIGS. 5 and 6 allows for sensitive information to be protected while it is being stored during operation on dynamic memory 500.

Figure 7:
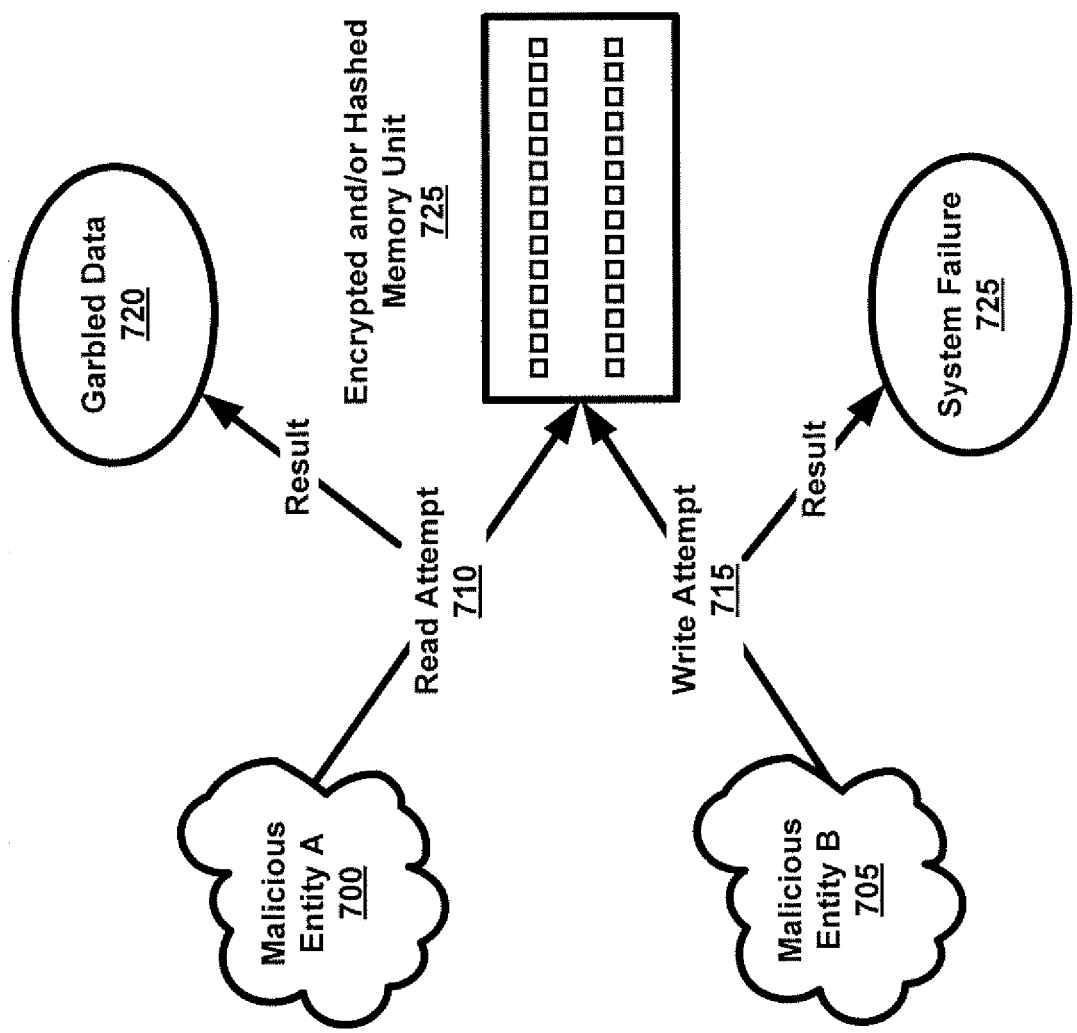
FIG. 7 illustrates how the security layer protects important information and the consequences of tampering with protected information.

FIG. 7 shows how the security mechanisms mentioned above protect important information, and the consequences of tampering with protected information. For example, malicious entity A 700 (which can be a person, a computer program, and so on), can attempt to read 710 the encrypted and/or hashed memory unit 725. However, the result of such a read 710 is that the data becomes garbled and undecipherable 720. Similarly, if a malicious entity B 705 attempts to write 715 to the encrypted and/or hashed memory unit 725, the result can be a system failure 725—for instance, when a security system discovers a mismatch in hash values. (It should be noted that Entity A 700 and Entity B 705 can be the same entity, different entities, entities of different kind, and so on). In this latter scenario, the entire computing system, whether it be a console, a personal computer, any kind of mobile device, and so on, can fail upon such a write attempt to sensitive data.

Furthermore, in the scenario where a write occurs to memory that is encrypted but not hashed, such a write may succeed, but since a malicious entity making the write is not aware of encryption key values, garbled data will end up being written. Thus, in another aspect of the presently disclosed subject matter, the sensitive information is encrypted with hidden keys associated with the computing device but not accessible to any malicious entity.

Figure 8:
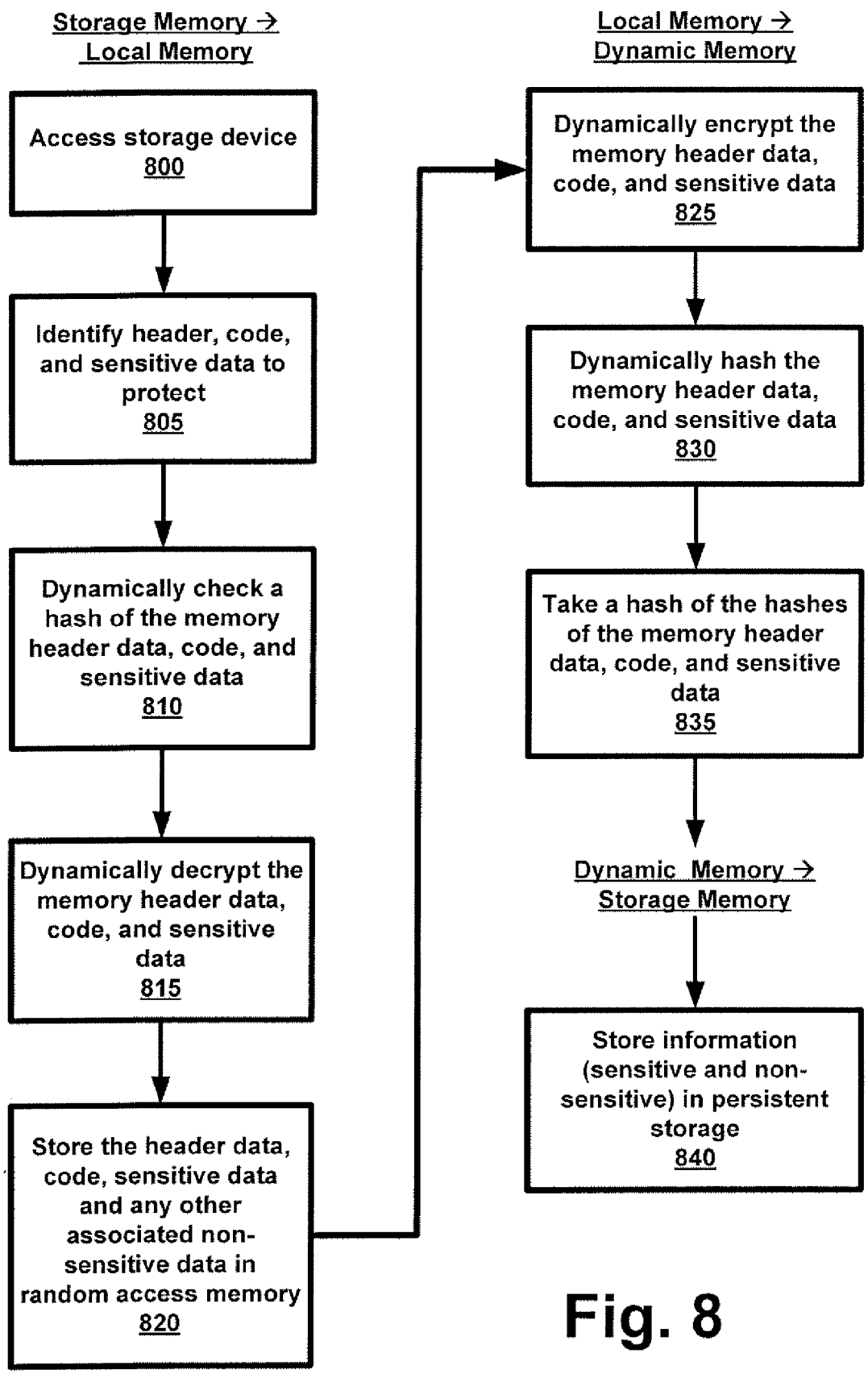
FIG. 8 illustrates a block diagram flow chart summarizing various aspects of dynamically encrypting and/or hashing sensitive memory units discussed with respect to FIGS. 1-7.

Finally, FIG. 8 illustrates a block diagram flow chart summarizing various aspects of dynamically encrypting and/or hashing sensitive memory units. For example, the presently disclosed subject matter can not only be instantiated as a system, but it can also be stored in a computer readable medium storing thereon computer executable instructions or it can be practiced as a method. For example, at block 800, a computer readable medium can have at least one instruction configured to access a persistent storage device. For example, the instructions can be copied from the medium onto console memory.

Next, at block 805, the computer readable medium can have at least one instruction configured to identify in the memory header data, code, and sensitive data. As was mentioned, not all data on the exemplary external hard drive has to be sensitive. Only certain information, such as game points, scores, and so on may be sensitive. Other data, such as avatar and game subject matter (cars, characters, and so on) configuration may not be sensitive, and hence not of concern to protect.

In one aspect of the presently disclosed subject matter, information about which code and/or data is sensitive and the level of protection given to various ranges thereof in memory can be stored within the data itself. One potential location for this data can be a single master information header included with the data. Another potential location can be a unit-specific information header that describes a level of protection granted to the range following it.

At block 810, shown is at least one instruction configured to dynamically check a hash of the memory header data, code, and sensitive data, and then at block 815, at least one instruction configured to dynamically decrypt the memory header data, code, and sensitive data. The order of such checking and decrypting may be reversed, depending on the need. Moreover, such dynamic checking and decrypting (and hashing and encrypting) of memory units can be performed by the encryption/decryption 505 and hashing layers 510. Once the aforementioned information is unencrypted and checked, it can be stored on local memory, as discussed with respect to FIG. 6.

At block 820, once the relevant information has been checked and decrypted, at least one instruction can be configured to store the header data, code, sensitive data and any other associated non-sensitive data in random access memory. Regarding the non-sensitive data (or more generally, information), it can also be stored on a console along with the checked and decrypted sensitive data. Moreover, the mentioned memory is exemplary and non-limiting, since any on or off processor memory can be used to store such information (including any internal console hard disk memory). The way in which such information will be stored will depending on the computing device in question, possibly varying for game consoles, personal computers, and mobile devices (such as cell phones).

At block 825, at least one instruction is configured to dynamically encrypt the memory header data, code, and sensitive data as it is loaded onto a runtime dynamic memory. Such information may persist in the dynamic memory during the operation of a computing device, and it may be accessed by a processor (in the process of being access and loaded on processor local memory, such information in the meantime may be unencrypted and/or checked). Once the processor is done processing the information, it can once again be encrypted and/or hashed and stored in the dynamic memory for later processing. Finally, at block 840, any information designated for persistent storage, whether sensitive or non-sensitive, can be stored in persistent storage so that when the computing device is turned off, it will not be lost.

It should be noted that in performing a dynamic hash at block 830, additional integrity measures can be taken, such as performing a hash of hashes, as is shown at block 835. Once all the desired security measures are taken (e.g. encryption and integrity hashing), more instructions can be configured to store the memory header data, code, sensitive data and any other associated non-sensitive data in various memories. By dynamically providing memory unit-by-memory unit encryption and hashing on the console, selected sensitive information can be protected in non-traditional contexts, such as dynamic memory (which in the past has been vulnerable to hacker attacks).

Figure 9:
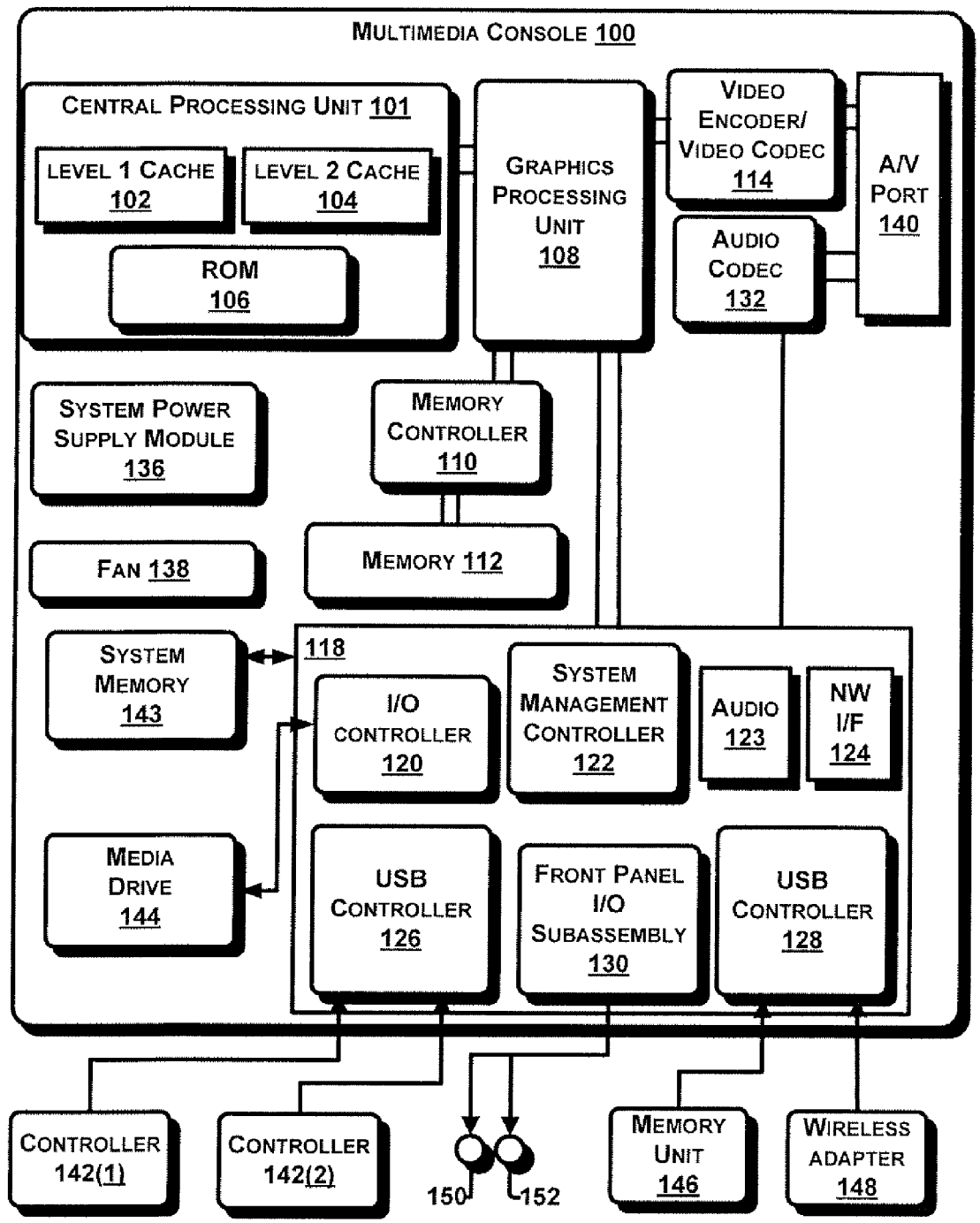
FIG. 9 illustrates in block diagram form an exemplary multimedia console that can be used in conjunction with the various aspects of the system discussed with reference to FIGS. 1-8 and 10.

Exemplary Computing Devices and Networks for Tamper Resistant Memory Protection Mechanisms The above discussed computing devices, whether native or remote, can be embodied as gaming consoles, music players, personal computers, and other such devices having different, similar, or the same platforms. Contemplated herein are also hand-held devices, laptops, cell phones, and so on. Referring to FIG. 9, a block diagram shows an exemplary multimedia console that can be used in conjunction with the various aspects of the tamper resistant memory protection system discussed above. This console, which includes a game oriented console or a PC, may comprise, for example, digital audio processing functionality. Specifically, in FIG. 10, a multimedia console 100 is shown, with a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase can be stored in a flash memory device (not shown). Further, ROM 106 can be located separately from the CPU 101. These memory devices can cache parts or the entirety of the above mentioned applications, programs, applets, managed code, and so on. Moreover, these memory devices can store sensitive and non-sensitive information on a memory unit-by-memory unit basis, as was discussed above.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory). Thus, various types of information, whether sensitive or not, or even parts of various types of information, can be stored in the various types of memories discussed above, depending on the need.

The multimedia console 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). Moreover, the network interface 124 and/or wireless adapter 148 can provide access to a network (e.g., the Internet, home network, etc.) and may be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 can be connected to the I/O controller 120 via a bus, such as a Serial ATA bus or other high speed connection (e.g., IEEE 1394).

The system management controller 122 can provide a variety of service functions to assure the availability of the multimedia console 100. The audio processing unit 123 and an audio codec 132 can form a corresponding audio processing pipeline with high fidelity, 3D, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the multimedia console 100. A system power supply module 136 can provide power to the components of the multimedia console 100. A fan 138 can cool the circuitry within the multimedia console 100.

The CPU 101, GPU 108, memory controller 110, and various other components within the multimedia console 100 can be interconnected via one or more buses, including serial and parallel buses, a memory bus, a peripheral bus, and a processor or local bus using any of a variety of bus architectures.

When the multimedia console 100 is powered on or rebooted, application data can be loaded from the system memory 143 into memory 112 and/or caches 102, 104 and executed on the CPU 101. Such application data can include some of the online derived data. The application may also present a graphical user interface that provides a consistent user experience when navigating to different media types available on the multimedia console 100. In operation, applications and/or other media contained within the media drive 144 can be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community of computing devices. As such a participant, it may interact with computing devices, whether PCs or servers, and receive information that may be eventually stored.

Figure 10:
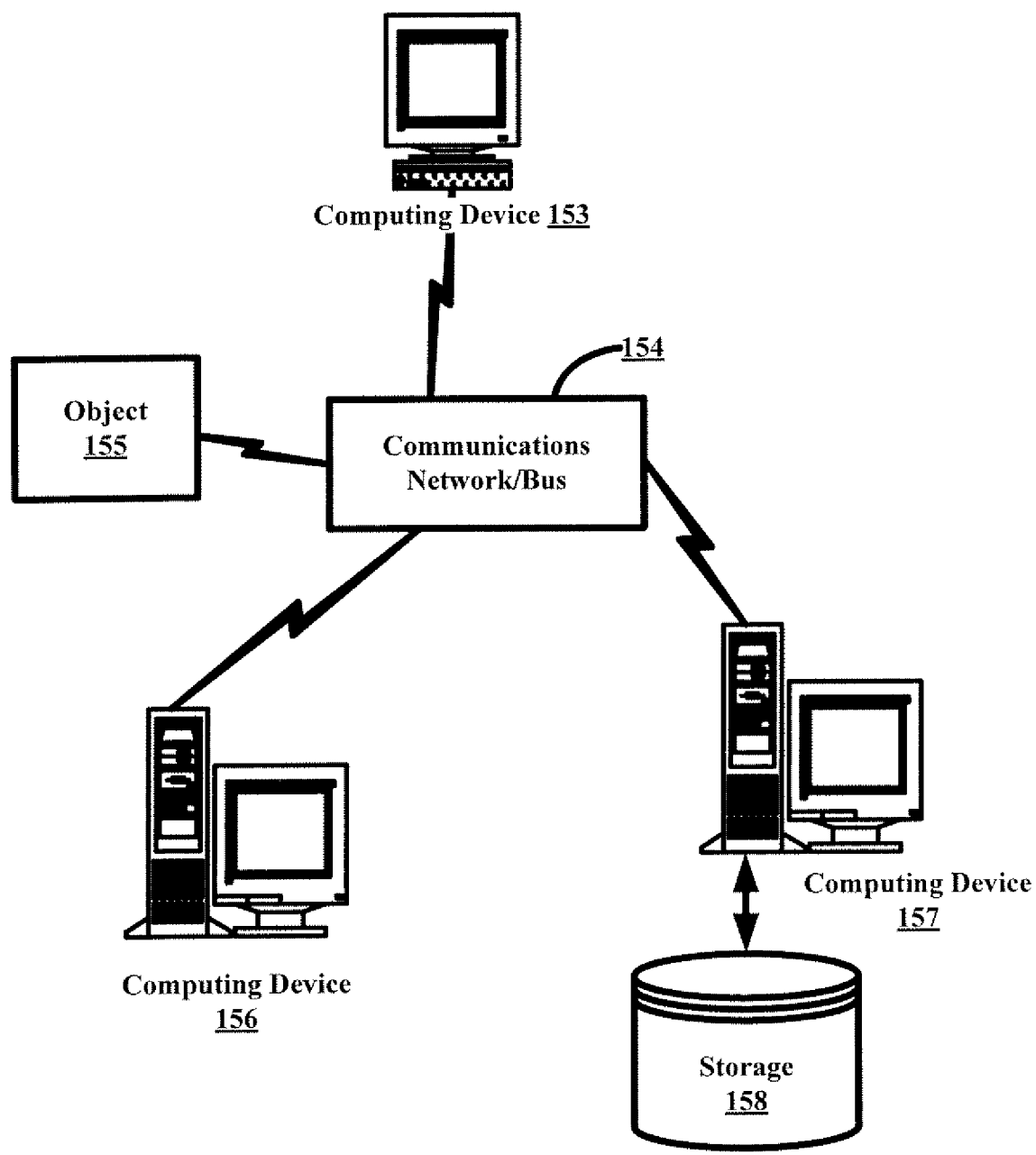
FIG. 10 illustrates an exemplary networking environment for subject matter discussed with reference to FIGS. 1-9.

Next, FIG. 10 illustrates an exemplary networking environment for subject matter discussed with reference to FIGS. 1-9. The above discussed gaming console 100 can correspond to any one of the aforementioned computing devices, or it can be distributed over such devices. It can interact with various other objects 155 and storage devices 158 via a communications network/bus 154, where such objects and devices can correspond to other computing devices (whether hardware, firmware, or software). The cross-platform applications can communicate in peer-to-peer networks or client-server based networks, depending on the implementation. Thus, sensitive information can not only be stored on the exemplary external hard disks that are attached to game consoles, but rather such information can be remotely located and access over any kind of network.

Finally, it should also be noted that the various techniques described herein may be implemented in connection with hardware or software or, where appropriate, with a combination of both. Thus, the methods and apparatus of the presently disclosed subject matter, or certain aspects or portions thereof, can take the form of program code (i.e., instructions) embodied in tangible storage media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing application programming interface (API) or the like, are preferably implemented in a high level procedural or object oriented programming language to communicate with a computer system. However, the program(s) can be implemented in assembly or machine language, if desired. In any case, the language may be a compiled or interpreted language, and combined.

Finally, while the present disclosure has been described in connection with a plurality of exemplary aspects, as illustrated in the various figures and discussed above, it is understood that other similar aspects may be used or modifications and additions may be made to the described aspects for performing the same function of the present disclosure without deviating therefrom. For example, in various aspects of the disclosure, methods, systems, and computer readable media were described configured for providing tamper resistant memory protection mechanisms. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for protecting security of memory in a computing environment, the system comprising:
    a hardware memory comprising a plurality of memory units;
    at least one memory unit of said plurality of memory units configured to house a memory page comprising memory page header data, code, sensitive data, and other data;
    an encryption layer configured to encrypt at least said memory page header data, said code, and said sensitive data of the memory page and configured to leave said other data of the memory page unencrypted, wherein said encryption layer prevents reading of said memory page header data, said code, and said sensitive data;
    a hashing layer configured to hash at least said memory page header data into a memory page header hash, said code into a code hash, and said sensitive data into a sensitive data hash and to subsequently hash a combination of the memory page header hash, the code hash and the sensitive data hash to form encrypted and combined hashed memory page header data, code and sensitive data, wherein said hashing layer prevents any changes to said memory page header data, said code, and said sensitive data;
    a security layer that manages said encryption layer and said hashing layer, wherein said security layer is configured to receive data housed in said at least one memory unit, and manage dynamic encryption and hashing of said memory page header data, said code, and said sensitive data; and
    a module configured to store said encrypted and combined hashed memory page header data, code and sensitive data, and said other data in dynamic memory of said computing environment.

2. The system according to claim 1, wherein said security layer further comprises a decryption layer configured to dynamically decrypt said memory page header data, code, and said sensitive data.

3. The system according to claim 1, wherein said at least one memory unit is a selected amount of bits.

4. The system according to claim 1, wherein said memory page header data is data about at least one of said code and said sensitive data.

5. The system according to claim 1, wherein said memory page header data, said code, said sensitive data, and said other data are stored on persistent storage attached to a computing device.

6. The system according to claim 1, wherein said memory page header data, said code, said sensitive data, and said other data are stored on random access memory inside a computing device.

7. The system according to claim 1, wherein said encryption layer encrypts portions of said at least one memory unit after said hashing layer hashes the portions of said at least one memory unit.

8. The system according to claim 1, wherein said computing environment is a closed system gaming console.

9. The system according to claim 1, wherein said computing environment is one of (a) a mobile device and (b) a stationary device.

10. The system according to claim 1, wherein at least one of (a) said encryption layer and (b) said hashing layer is distributed over a network.

11. The system according to claim 1, wherein said plurality of memory units are distributed over different memory storage devices.

12. A method for preventing tampering with memory in a computing environment, the method comprising:
    receiving a memory page comprising memory page header data, code, sensitive data, and non-sensitive data;
    encrypting said memory page header data, said code, and said sensitive data of the memory page while leaving said non-sensitive data of the memory page unencrypted;
    hashing said memory page header data into a memory page header hash, hashing said code into a code hash, and hashing said sensitive data into a sensitive data hash, and subsequently hashing a combination of the memory page header hash, the code hash and the sensitive data hash to form encrypted and combined hashed memory page header data, code and sensitive data; and
    storing said encrypted and combined hashed memory page header data, code, and sensitive data of the memory page and the unencrypted non-sensitive data of the memory page in a dynamic memory of a computing device.

13. The method according to claim 12, further comprising decrypting dynamically said memory page header data, said code, and said sensitive data from said dynamic memory and storing a result of said decrypting in a local memory of said computing device.

14. The method according to claim 13, further comprising checking said encrypted and combined hashed memory page header data, code, and sensitive data for any changes to said encrypted and combined hashed memory page header data, code, and sensitive data when receiving said encrypted and combined hashed memory page header data, code, and sensitive data from a persistent storage or said dynamic memory.

15. The method according to claim 12, further comprising storing said encrypted and combined hashed memory page header data, code, and said sensitive data in a persistent storage.

16. A computer-readable storage medium, other than a signal, storing thereon computer-executable instructions for preventing tampering with memory in a computing environment, the computer-executable instructions comprising instructions for:

receiving a memory page comprising memory page header data, code, sensitive data, and non-sensitive data;

encrypting said memory page header data, said code, and said sensitive data of the memory page while leaving said non-sensitive data of the memory page unencrypted;

hashing said memory page header data into a memory page header hash, hashing said code into a code hash, and hashing said sensitive data into a sensitive data hash, and subsequently hashing a combination of the memory page header hash, the code hash and the sensitive data hash to form encrypted and combined hashed memory page header data, code and sensitive data; and storing said encrypted and combined hashed memory page header data, code, and sensitive data of the memory page and the unencrypted non-sensitive data of the memory page in a dynamic memory of a computing device.

17. The computer-readable storage medium according to claim 16, wherein the computer-executable instructions further comprise instructions for decrypting dynamically said memory page header data, said code, and said sensitive data from said dynamic memory and storing a result of said decrypting in a local memory of said computing device.

18. The computer-readable storage medium according to claim 17, wherein the computer-executable instructions further comprise instructions for checking said encrypted and combined hashed memory page header data, code, and sensitive data for any changes to said encrypted and combined hashed memory page header data, code, and sensitive data when receiving said encrypted and combined hashed memory page header data, code, and sensitive data from a persistent storage or said dynamic memory.

\* \* \* \* \*